J. A. HALL.
Hand-Plow.

No. 58,814.

Patented Oct. 16. 1866.

Witnesses:
Alex T. Roberts
Jan Compton

Inventor:
Joel A. Hall
per Chumley
Attorneys.

UNITED STATES PATENT OFFICE.

JOEL A. HALL, OF COLUMBUS, OHIO.

IMPROVEMENT IN GARDEN-CULTIVATORS.

Specification forming part of Letters Patent No. 58,814, dated October 16, 1866.

*To all whom it may concern:*

Be it known that I, JOEL A. HALL, of Columbus, in the county of Franklin and State of Ohio, have invented a new and useful Improved Garden-Cultivator; and I do hereby declare that the following is a full, clear, and exact description thereof, reference being had to the accompanying drawings, and to the letters of reference marked thereon, making a part of this specification.

The nature of my invention consists in so constructing a machine moved by hand that any kind of grain may be sown in drills, as may be desired, in any quantity.

The machine is also provided with cultivator-teeth or shovels, of any desired form, for covering the grain or eradicating the weeds, and loosening up the ground more thoroughly and perfectly than by hand-culture.

To enable others skilled in the art to make and use my invention, I will proceed to describe its construction and operation.

Figure 1:
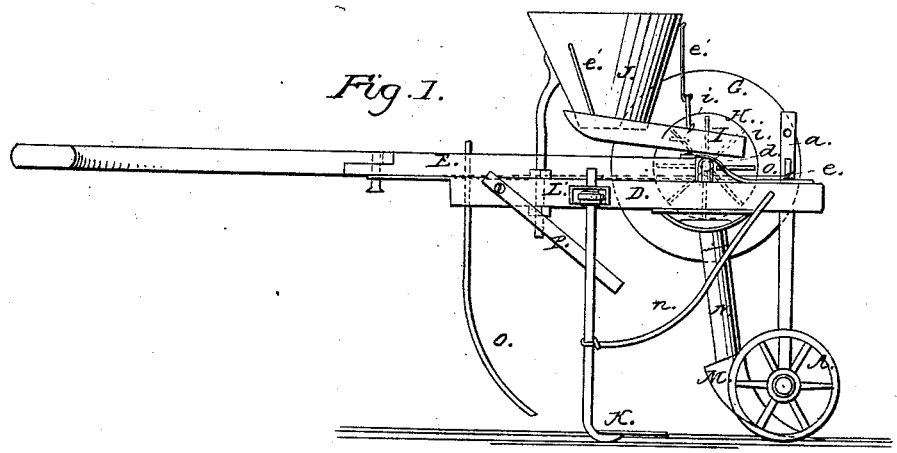
Figure 2:
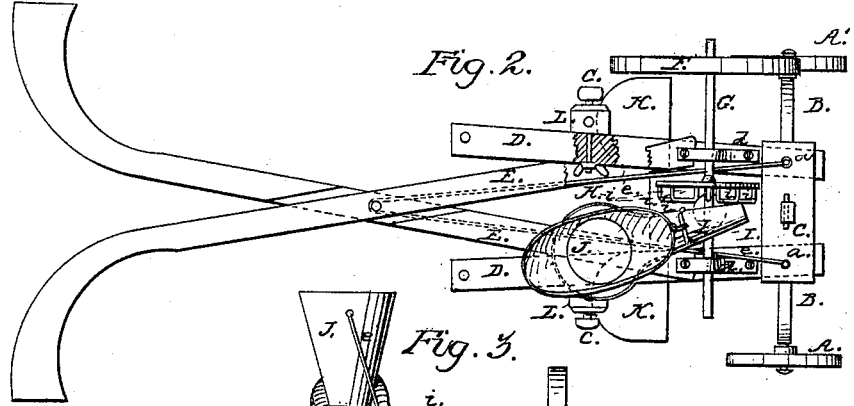
Figure 3:
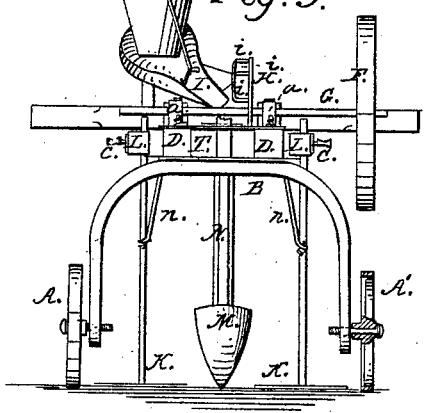

Figure 1 is a side elevation of my improved garden-cultivator. Fig. 2 is a top-plan view of the same. Fig. 3 is an end elevation, showing a vertical section of one of its wheels.

Letters of like name and kind refer to like parts in each of the drawings.

A A' are two wheels of common construction, upon which the seeding apparatus and plows run. These wheels run on bearings upon a curved axle, B, upon the top and in the center of which is a T-plate, secured in an inverted position, with the stem projecting up through another plate, C, and secured by a key or pin passing through the stem of the T-plate before mentioned. Between the two plates are secured two timbers or side pieces, D D, by the bolts *a a*, around which pass the brace rods or board *e e*, that extend back, and both secured by one bolt at the crossing of the handles E E, the forward ends of which are secured by bolts to the side pieces, D D, with straps *d d* running from over the ends of the said handles down onto the side pieces, D D, to which they are secured by bolts.

F is a band-wheel, that is secured and runs on the shaft G, that has bearings upon the side pieces, D D. Upon this shaft G is another wheel, H, provided with pintles or staples *i*, for the purpose of shaking the seed-shoe I, which is provided with a cam, against which the pintles in the wheel H work. This shoe I is suspended by links *e'* or otherwise immediately under the hopper J.

K K are hoes or shovels, the standard of which passes up through blocks L L, and secured in any desired position by means of a thumb-screw, *c c*. These hoes are supported by braces *n n*, one end of which is secured to the side pieces D D.

M is a shovel attached to a concave standard, N, at the top of which is a cross-plate, through which the seed passes from the hopper to the ground. This shovel is for the purpose of making the furrow for the seed.

O O are shovel-tongues, that are secured in the rear end of the side pieces, D D, but may be removed and take the place of the hoes K K when the nature of the work requires it.

P P are braces secured to the sides of the pieces D D, and incline down beside the standards of the hoes K, to steady them while at work.

It will be seen that the hoes can be elevated and lowered to any desired depth, and set at any angle.

The operation is simple, easy, and perfect, and consists in pushing the machine along by the handles E, which puts in motion the traction-wheel A', around the hub of which passes a band over the band-wheel F, that puts in motion the wheel H, in which are the pintles that come in contact with the shoe I under the hopper J, that gives the shoe a shaking motion, and the seed is conducted to the ground, and covered by the plows or tongues O O. At the same time the hoes K K are removed, making it one of the best and most convenient and useful garden implements, the adjustment, in connection with the other parts, being specially adapted for this purpose.

It will be observed that by removing the plow M the rear end of the frame or levers may be spread, or the side pieces may be moved out or in, while the machine is in operation, so as to cut out plants or weeds at will, as may be found desirable.

Having thus explained my invention, what I claim as new, and desire to secure by Letters Patent, is—

1. The cross handles or levers E, attached to the side pieces, D D, in combination with the hoes K K, axle B, and wheels A A', substantially as described.

2. The plate T, in combination with axle B, for the purposes and substantially as described.

JOEL A. HALL.

Witnesses:
A. GARDNER, Jr.,
JOS. H. RILEY.